J. TREES.
WATER PIPE.
No. 67,614. Patented Aug. 6, 1867.
Fig: 2.
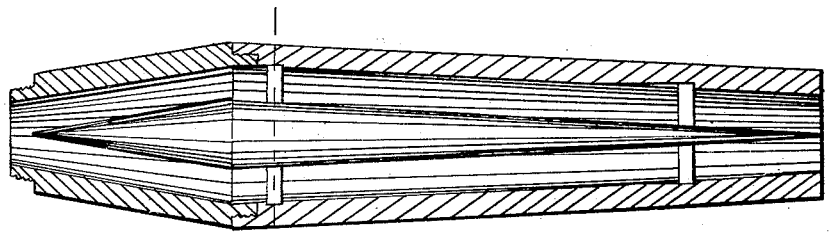
Fig: 3. Fig: 4.
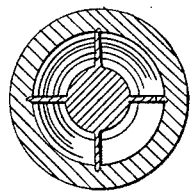 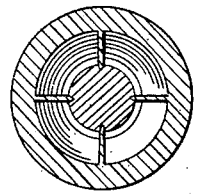
Witnesses:
Inventor:

United States Patent Office.

JAMES TREES, OF GREENSBURG, PENNSYLVANIA.

*Letters Patent No. 67,614. dated August 6, 1867.*

---

IMPROVEMENT IN WATER PIPES.

---

The Schedule referred to in these Letters Patent and making part of the same.

---

TO ALL WHOM IT MAY CONCERN:

Be it known that I, JAMES TREES, of Greensburg, in the county of Westmoreland, and State of Pennsylvania, have invented a certain new and useful improvement in Pipes for Conveying Water and other fluids, of which the following is a full, clear, and exact description, reference being had to the accompanying drawings, which make part of this specification, in which—

Figure 1 represents a longitudinal central section through a pipe embracing my improvement.

Figure 2 represents a transverse section through the same at the line $x\ x$ of fig. 1; and Figure 3 represents a similar section, showing a modification of my invention.

It is the object of my invention to increase the quantity of water delivered in a given time through a pipe of given area; and to this end my improvement consists in constructing the pipes in the form of frusta of cones placed base to base, and supporting concentrically therein a series of cones, likewise placed base to base, as hereinafter described.

I make the section D of the pipe in the form of the frustum of a cone, with an inclination or taper of say five degrees. A cone, F', of similar form, but of smaller diameter, is placed within the pipe, being supported concentrically therein by braces $b$. I then place a shorter and more abrupt cone F with its base against that of the cone F', and in the same axial plane. A frustum, C, of a cone having an inclination parallel to that of cone F is placed over it, and connected at its larger end to the main pipe D. The cone C is to be connected to the smaller end of a section similar to the long one, D, when the point of cone F' will abut against that of a cone corresponding to the short one F.

My improved pipe, it will thus be seen, consists of a series of frusta of cones placed base to base, and enclosing a series of corresponding cones similarly arranged in the axis of the pipe, so as to leave an annular water-way of uniform area but of varying inclination. The form chosen for the cones is that demonstrated to offer the least resistance to the passage of a solid through fluids, and of course the same form would offer the least possible resistance to the flow of a fluid around it. The fluid first impinges against the short cones, and then flows down the sides of the long ones.

It is a well-known fact that a fluid will escape more rapidly through an ajutage or discharge pipe which flares from its entrance to its exit than through one having a discharge-orifice of equal area but with a pipe having parallel sides. The theory of my invention is that the lines of pressure of the fluid are parallel to the exterior of the pipe, and I believe that by using an internal cone parallel or concentric with the pipe, and thus keeping the pressure in this direction, I obtain an increased flow of water. But the pipe would soon become too large for practical use did it continue to expand or flare. The necessity of providing against this difficulty led me to the discovery that by varying the inclination or direction of the water-way, without diminishing the area, the flow would not be sensibly obstructed.

It is obvious that the pipes may be united in any suitable manner, and that the sections may either be formed separately or together, but in the latter case the section C had better be cast on the small end of the long section D, for convenience in removing or inserting the cones. The cones may be supported centrally by knife-edge braces $b$, as shown in the drawings, and may also be made to dove-tail into each other at their points, in which case the number of braces may be diminished. The braces may either be connected to the cone and removable with it, as in fig. 2, or to the pipe, as in fig. 3, but I prefer to unite them to the cone, as they can be removed with it, and will hold the cone securely in place whenever inserted in the pipe. The central cones may be either solid or hollow.

What I claim as my invention, and desire to secure by Letters Patent, is—

1. A pipe composed of frusta of cones of alternately varying inclination, arranged base to base, substantially in the manner and for the purpose described.

2. The combination, substantially in the manner described, with a pipe composed of frusta of cones arranged base to base, of a corresponding series of cones arranged concentrically within the pipe, for the purpose set forth.

In testimony whereof I have hereunto subscribed my name.

JAMES TREES.

Witnesses:
J. I. PEYTON,
WM. D. BALDWIN.